United States Patent
Boody

(10) Patent No.: US 10,408,486 B2
(45) Date of Patent: Sep. 10, 2019

(54) SELF-MODULATING HVAC SYSTEM

(71) Applicant: Scientific Environmental Design, Inc., Charlotte, NC (US)

(72) Inventor: Harry Boody, Jamestown, NC (US)

(73) Assignee: Scientific Environmental Design, Inc., High Point, NC (US)

( * ) Notice: Subject to any disclaimer, the term of this patent is extended or adjusted under 35 U.S.C. 154(b) by 276 days.

(21) Appl. No.: 15/332,556

(22) Filed: Oct. 24, 2016

(65) Prior Publication Data

US 2018/0112886 A1 Apr. 26, 2018

(51) Int. Cl.
*F24F 3/14* (2006.01)
*F24F 11/77* (2018.01)
(Continued)

(52) U.S. Cl.
CPC .............. *F24F 11/77* (2018.01); *F24F 3/044* (2013.01); *F24F 3/1405* (2013.01); *F24F 11/30* (2018.01); *F24F 11/81* (2018.01); *F24F 11/46* (2018.01); *F24F 11/58* (2018.01); *F24F 11/63* (2018.01); *F24F 11/64* (2018.01);
(Continued)

(58) Field of Classification Search
CPC .. F24F 11/30; F24F 11/46; F24F 11/58; F24F 11/63; F24F 11/64; F24F 11/77; F24F 11/81; F24F 3/044; F24F 3/1405; F24F 2110/10; F24F 2110/20; F24F 2110/40; F24F 2003/144; F24F 2130/00; F24F 2130/10; F24F 2140/60; F24F 2203/02; F24F 2203/021
See application file for complete search history.

(56) References Cited

U.S. PATENT DOCUMENTS 4,104,888 A * 8/1978 Reedy .................. F25D 21/006
62/140
4,487,363 A * 12/1984 Parker ................. G05D 16/208
236/49.3

(Continued)

OTHER PUBLICATIONS

U.S. Appl. No. 14/161,849, filed Aug. 18, 2014, Dempsey, Daniel J.
U.S. Appl. No. 10/314,604, filed Jun. 10, 2004, Wacker, Paul.
U.S. Appl. No. 14/264,188, filed Aug. 21, 2014, Carson et al.

*Primary Examiner* — Jonathan Bradford
(74) *Attorney, Agent, or Firm* — Gregory Finch; Finch Paolino, LLC

(57) ABSTRACT

A smart HVAC system includes a plurality of sensors that monitor the temperature and humidity of a conditioned space and the energy efficiency of the HVAC system. A system controller is operable to control one or more bypass dampers. The modulation of air volume allows the cooling coil to achieve an optimum BTU extraction rate, and regulate temperature and humidity levels of the conditioned space. Sensor data is interpreted by a controller to modulate positioning of the dampers, thereby regulating the volume of air moved across the cooling coil. The smart HVAC system regulates the amount of air moved over the coil according to the desired system output, which includes temperature humidity and energy efficiency while maintaining a constant movement of air and the optimal amount of air exchanges per hour throughout the conditioned space with enhanced dehumidification and mold free systems.

10 Claims, 10 Drawing Sheets

(51) Int. Cl.
*F24F 3/044* (2006.01)
*F24F 11/30* (2018.01)
*F24F 11/81* (2018.01)
*F24F 11/63* (2018.01)
*F24F 11/64* (2018.01)
*F24F 11/58* (2018.01)
*F24F 110/20* (2018.01)
*F24F 130/10* (2018.01)
*F24F 110/10* (2018.01)
*F24F 11/46* (2018.01)
*F24F 140/60* (2018.01)
*F24F 130/00* (2018.01)
*F24F 110/40* (2018.01)

(52) U.S. Cl.
CPC ....... *F24F 2110/10* (2018.01); *F24F 2110/20* (2018.01); *F24F 2110/40* (2018.01); *F24F 2130/00* (2018.01); *F24F 2130/10* (2018.01); *F24F 2140/60* (2018.01)

(56) References Cited

U.S. PATENT DOCUMENTS

| | | | |
|---|---|---|---|
| 6,386,281 B1 | 5/2002 | Ganesh et al. | |
| 6,604,688 B2 | 8/2003 | Ganesh et al. | |
| 6,986,386 B2 | 1/2006 | Sekhar et al. | |
| 7,059,400 B2 | 6/2006 | Sekhar et al. | |
| 8,052,062 B2 | 11/2011 | Stark | |
| 8,151,578 B1* | 4/2012 | Morales | F24F 3/0442 62/259.2 |
| 9,121,620 B2 | 9/2015 | Rohde | |
| 9,459,668 B2* | 10/2016 | Towner | F24F 6/02 |
| 2007/0199338 A1* | 8/2007 | Evans | B60H 1/3213 62/228.4 |
| 2014/0075977 A1* | 3/2014 | Elliott | F24F 3/1405 62/176.1 |
| 2014/0200718 A1* | 7/2014 | Tessier | G05D 23/1902 700/276 |
| 2014/0262134 A1* | 9/2014 | Arensmeier | F24F 11/02 165/11.2 |
| 2016/0217674 A1* | 7/2016 | Stewart | G08B 21/187 |

* cited by examiner

SELF-MODULATING HVAC SYSTEM

FIELD

The present disclosure relates to the field of heating ventilation and air conditioning (HVAC) systems; in particular, a self-modulating HVAC system for improved energy efficiency and performance.

BACKGROUND

An HVAC system is the primary system for providing steady-state thermal comfort and acceptable indoor air quality in residential homes and commercial structures. HVAC systems are well known in the prior art, and function to selectively circulate conditioned air throughout a home or structure according to feedback from a thermostat. When engaged in a cooling mode, a typical HVAC unit passes air over a cooling coil and discharges conditioned air throughout the home via ductwork until a desired temperature is reached. Passing air over the cooling coil also functions to dehumidify the passing air. When the temperature of the air in the structure reaches a desired temperature on the thermostat, the unit shuts down until cool air is needed again.

An emphasis on energy efficiency can be found in every aspect of the home environment. By adding energy-efficient windows and insulation to a home, the heating and cooling loads decrease greatly. Numerous attempts have been made in the prior art to improve the energy efficiency of HVAC systems. Over the years, HVAC units have become more efficient (by government mandate). In order to manufacture these units with more efficiency, their best cost to benefit ratio was to increase the "Sensible Output" (which is the cooling BTU output side of air conditioning). This results in a decrease of "Latent Output," which is the moisture removal BTU side of air conditioning. By increasing the coil size, an HVAC system can achieve more Sensible BTU output with less power consumed for the same given amount of airflow across the indoor coil at 400 CFM/Ton. This increases the SEER rating of the unit. However, increased coil size reduces the temperature of the coil, due to extracting more BTU's from the larger coil surface, resulting in reduction of condensation and moisture removal. Therefore, the amount of airflow, or cubic feet per minute (CFM), moving across the indoor coil is critical for dehumidification. Unfortunately, many manufactures are now recommending airflow be dropped below the 400 CFM/Ton standard to try to remove more moisture off the coil or lower the indoor temperature to over-cool the space. Both of these actions create mold control issues.

HVAC systems employing oversized equipment exhibit the unintended consequence of failing to have a long enough run time in cooling mode to extract sufficient humidity out of air in the structure, i.e. increased sensible output is achieved at the expense of latent output. As a result, insufficient airflow is delivered to the conditioned space. The current trend in prior art solutions favors energy savings at the expense of increased humidity. To amplify this problem, when super-cooled air is discharged into the humid air in the surrounding duct work, condensation occurs in the duct work. This scenario provides optimal conditions for mold growth in the duct system. In addition to mold growth, discharging humid air into the conditioned space can cause various structural issues, such as peeling paint, soggy drywall, frame and trim rot from condensation on windows, and mold or mildew growth in carpets.

Another limitation with prior art HVAC systems is that the operation of the system is based on static temperature controls. When the temperature of the home is above a desired value, the thermostat triggers a cooling call to the HVAC system to discharge cool air throughout the home. If the temperature falls below the desired value, the cooling call is cancelled, in turn shutting off the airflow. This temperature based feedback response fails to take into account the other conditions in the home a HVAC system should manage, such as humidity level of the indoor air, air exchanges per hour and air quality, and system energy consumption.

The prior art includes many examples of HVAC systems that have tried to solve some of the previously described problems. For example, U.S. Pat. No. 6,604,688 utilizes a bypass system in low load conditions that shunts return air around the cooling coil and injects it back into the system post cooling coil. The temperature of the cooling coil is increased which decreases its ability to removed latent heat and dehumidify the incoming air. To compensate, the bypass damper opens to allow all the return air to bypass the cooling coil. This allows drier, warm return air to mix with the incoming air that passed over the coil and maintain the supply air at a warmer temperature during low load conditions. However, increasing the temperature of the cooling coil decreases its ability to draw moisture from the incoming air and does not provide a substantial dehumidifying effect. In addition, this system utilizes valves to substantially close off airflow in the ducts during low load conditions, thereby maintaining a constant temperature yet failing to provide sufficient air exchange to such space.

What is needed, therefore, is a HVAC system capable of cooling and dehumidifying the air in a home, while maintaining sufficient airflow and energy-efficiency. Through applied effort, ingenuity, and innovation, Applicant has identified a number of deficiencies and problems with HVAC systems. Applicant has developed a solution that is embodied by the present invention, which is described in detail below.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An object of the present disclosure is a self-modulating HVAC system having a cooling coil bypass to maintain an appropriate calculated airflow through the conditioned space while limiting the air that passes over the cooling coil to achieve an optimal sensible BTU rate for energy efficiency without adversely affecting the latent moisture removal side of air conditioning.

An object of the present disclosure is a self-modulating HVAC system having a dehumidification bypass operable to maintain humidity in the conditioned space below a desired level.

An object of the present disclosure is a self-modulating HVAC system that employs a cooling coil bypass to raise the temperature of discharged air before it enters the ducts to prevent condensation and mold growth.

A specific embodiment of the present disclosure is a self-modulating air handler, comprising a variable speed blower, the variable speed blower being housed in a blower chamber; a cooling coil, the cooling coil being housed in a coil chamber, the coil chamber being coupled to the blower chamber; a return air plenum coupled to an upstream portion of the coil chamber; a cooling coil bypass coupled from the return air plenum to the blower chamber upstream of the return air plenum and the coil chamber; a dehumidification bypass coupled from the return air plenum to the blower chamber upstream of the return air plenum and the coil chamber; a first motorized damper housed in the cooling coil bypass between the return air plenum and the blower chamber; and, a second motorized damper housed in the dehumidification bypass between the return air plenum and the blower chamber, the first motorized damper and the second motorized damper being selectively configured to an integral position between 0 degrees and 90 degrees.

Another specific embodiment of the present disclosure is a self-modulating HVAC system, comprising an air handler, the air handler comprising a variable speed blower, the variable speed blower being housed in a blower chamber, a cooling coil being housed in a coil chamber, the coil chamber being coupled to an upstream portion of the blower chamber, a return air plenum coupled to an upstream portion of the coil chamber, a cooling coil bypass coupled from the return air plenum to the blower chamber, a dehumidification bypass coupled from the return air plenum to the blower chamber, a first motorized damper housed in the cooling coil between the return air plenum and the blower chamber, and a second motorized damper housed in the dehumidification bypass between the return air plenum and the blower chamber; a heat pump, operably engaged with the air handler; a plurality of sensors comprising at least one temperature sensor and at least one humidity sensor; and, a controller, the controller being operably engaged with the air handler and the heat pump and being configured to receive a data input from the plurality of sensors, the controller being comprised of one or more processors, an input/output device, a Wi-Fi chipset, and a non-transitory computer readable medium having stored thereon a set of instructions being programmable by a user and executable by the at least one of the one or more processors, to cause the at least one of the one or more processors to perform one or more operations, the set of instructions comprising instructions for modulating the position of the first motorized damper in response to a data input from the temperature sensor; instructions for modulating the position of the second motorized damper in response to a data input from the humidity sensor; instructions for selectively engaging the heat pump and the variable speed blower in response to a data input from the temperature sensor.

Another specific embodiment of the present disclosure is a self-modulating HVAC system, comprising an air handler, the air handler comprising a variable speed blower, the variable speed blower being housed in a blower chamber, a cooling coil being housed in a coil chamber, the coil chamber being coupled to an upstream portion of the blower chamber, a return air plenum coupled to an upstream portion of the coil chamber, a cooling coil bypass coupled from the return air plenum to the blower chamber, a dehumidification bypass coupled from the return air plenum to the blower chamber, a first motorized damper housed in the cooling coil between the return air plenum and the blower chamber, and a second motorized damper housed in the dehumidification bypass between the return air plenum and the blower chamber; a heat pump, operably engaged with the air handler; a plurality of sensors comprising a temperature sensor, a humidity sensor, and a current transformer; a controller, the controller being operably engaged with the air handler and the heat pump and being configured to receive a data input from the plurality of sensors, the controller being comprised of one or more processors, an input/output device, a WiFi chipset, and a non-transitory computer readable medium having stored thereon a set of instructions being programmable by a user and executable by the at least one of the one or more processors, to cause the at least one of the one or more processors to perform one or more operations, the set of instructions comprising instructions for modulating the position of the first motorized damper in response to a data input from the temperature sensor; instructions for modulating the position of the second motorized damper in response to a data input from the humidity sensor; and, instructions for selectively engaging the heat pump and the variable speed blower in response to a data input from the temperature sensor; and, an application server, the application server being communicably engaged with the controller, the application server being comprised of one or more processors and a non-transitory computer readable medium having stored thereon and executable by the at least one of the one or more processors, to cause the at least one of the one or more processors to perform one or more operations, the set of instructions comprising instructions for receiving sensor data from the controller; and, instructions for communicating a service notice in response to sensor data to a client device.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION

Figure 1:
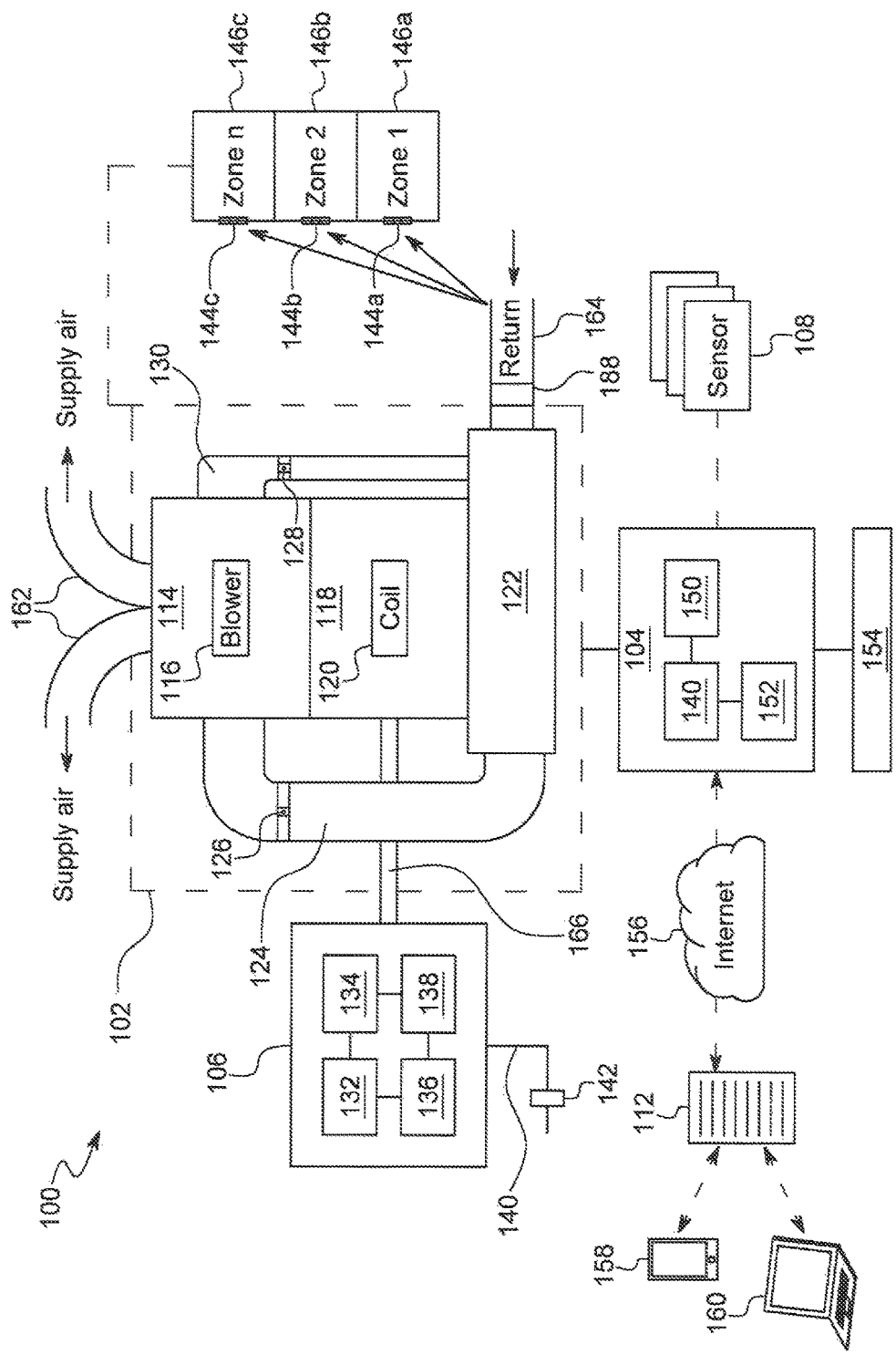
FIG. 1 is a system diagram of self-modulating HVAC system, according to an embodiment.

Exemplary embodiments are described herein to provide a detailed description of the present disclosure. Variations of these embodiments will be apparent to those of skill in the art. Moreover, certain terminology is used in the following description for convenience only and is not limiting. For example, the words "right," "left," "top," "bottom," "upper," "lower," "inner" and "outer" designate directions in the drawings to which reference is made. The word "a" is defined to mean "at least one." The terminology includes the words above specifically mentioned, derivatives thereof, and words of similar import.

Embodiments of the present disclosure provide for a self-modulating HVAC system. Embodiments of the present disclosure solve problems associated with prior art HVAC systems, including: failure to maintain appropriate airflow through the structure; discharge of supply air at temperatures below the dew point in the ducts leading to condensation and potential mold growth; and, failure to adequately dehumidify the conditioned air. The prior art is generally made of up HVAC systems with oversized cooling capacity that super cool air at an accelerated rate. These systems fail to adequately dehumidify the conditioned air because the cooling call is satisfied, thereby shutting down the system, before enough run time for air from the conditioned space been allowed to pass over the coil for dehumidification. This super-cooled air loses volume but still maintains the same amount of moisture. When this air comes into contact with the cold walls of the ducts it can cause condensation. Condensation in the ductwork can cause water leaks and instigate mold growth. Embodiments of the present disclosure seek to overcome the deficiencies in the prior art with an HVAC system that provides supply air at a more moderate consistent temperature to eliminate condensation and prevent water leakage and mold growth in the ducts. Another problem with the current systems is the inability to maintain appropriate airflow through a home when the cooling needs have been met. Many homes and buildings are able to maintain a desired temperature with minimal cooling; however, it is recommended to have at least four air exchanges per hour in order to filter and maintain optimal indoor air quality. With many HVAC systems, energy is conserved by only providing airflow when cooling is needed. This lack of air movement contributes to an increase in humidity in the conditioned space. Embodiments of the present disclosure seek to provide a smart HVAC system that, through a plurality of sensors and system controls, can regulate the amount of air moved over the coil according to the desired system output which includes temperature, humidity, energy efficiency while maintaining the appropriate amount of air exchanges per hour throughout the building.

According to various embodiments of the present disclosure, the problem of condensation in the air ducts is solved by utilizing a cooling coil bypass system that redirects air around the cooling coil directly to the downstream to the blower compartment to the supply plenum. This structure allows the air handler to pass the manufacturer's recommended volume of air over the cooling coil for optimum BTU extraction, while maintaining a continuous supply of bypass air to ensure air quality. The proportional manipulation of optimal airflow across the cooling coil provides for increased energy efficiency of the system. The bypass from the return air is directed into the blower compartment, where it mixes with and warms the conditioned air discharged from the cooling coil as supply air is discharged into the supply ducts. This mixture of air increases the temperature of the air in the supply plenum such that the temperature of the air is higher than the dew point of the surrounding air in the ductwork. This prevents condensation and mold growth within the ducts and surrounding structures.

According to various embodiments of the present disclosure, the problem of improper ratio of sensible output to latent output in prior art HVAC systems is solved by utilizing a smart HVAC system that includes a cooling coil bypass engaged with one or more bypass dampers and a blower, operable to redirect a desired volume of air around the cooling coil and directly to the upstream supply ducts. The blower is sized to maintain air flow according to the air load calculation of the building. The bypass dampers direct the manufacturer's suggested volume of air over the cooling coils, and redirect the excess air directly into the supply plenum, where it mixes with and warms the discharged conditioned air prior to it flowing into the ducts. This warmer supply air results in more gradual, steady cooling of the conditioned space. The disclosed method of the present disclosure utilizes continuous system run time and maintains the air moving through the space, enabling the system to maintain the optimal air exchanges per hour while simultaneously maintaining the optimum BTU extraction from the cooling coil, i.e. optimal sensible output to latent output ratio.

According to various embodiments of the present disclosure the problem of humidity in the conditioned space is solved by a dehumidification bypass within the air handler. A humidity sensor in the conditioned space triggers a damper within the dehumidification bypass to open when the air reaches 60% humidity. The open damper redirects a predetermined volume of the return air into bypass, thereby reducing the volume of air passing over the cooling coil. The reduced volume of air enables the coil to evaporate a great volume of moisture. The resulting dehumidified air is discharged and mixed with redirected air in the blower compartment, and directed into the supply plenum ducts and into the conditioned space. In a preferred embodiment, this process is maintained until the humidity of the conditioned space drops below 60%.

According to various embodiments of the present disclosure, a smart HVAC system includes a plurality of sensors that monitor the temperature and humidity of a conditioned space and the energy efficiency of the HVAC system. A system controller is operable to control one or more bypass dampers, which are operable to regulate the volume of air moved across the cooling coil. The modulation of air volume allows the cooling coil to achieve an optimum BTU extraction rate (i.e. sensible to latent heat ratio) and regulates temperature and humidity levels of the conditioned space.

The HVAC controller is operable to control the cooling calls made to the compressor. The sensor data is interpreted by the controller to modulate positions of the dampers, thereby regulating the volume of air moved across the cooling coil. The smart HVAC system regulates the amount of air moved over the coil according to the desired system output, which includes temperature humidity and energy efficiency while maintaining a constant movement of air and the optimal amount of air exchanges per hour throughout the conditioned space.

Referring now to FIG. 1, a system diagram of self-modulating HVAC system 100 is shown. According to an embodiment, a self-modulating HVAC system 100 is generally comprised of an air handler 102, a cooling coil 120, a cooling coil bypass 124, a dehumidification bypass 130, a first motorized damper 126 positioned in the cooling coil bypass, a second motorized damper 128 positioned in the dehumidification bypass, and an R/A plenum 122. Sensors 108 collect and communicate data regarding humidity and temperature in conditioned zones 1 through n 146a-c to the controller 104. When humidity levels rise above a threshold value, controller 104 activates a circuit to modulate dehumidification damper 128, which redirects a desired volume of air from return ducts 164 to flow through dehumidification bypass 130. An air filter 188 may be coupled to return ducts 164 upstream of R/A plenum 122 to filter the returning air before it reaches R/A plenum 122. To increase latent output of cooling coil 120, the airflow moving across cooling coil 120 can be reduced to a range of 200-350 CFM/ton. This reduced volume of air is drawn by blower 116 into a coil housing 118 and across the cooling coil 120. By decreasing the air volume moved over cooling coil 120, the latent moisture removal rate is increased thereby dehumidifying the air. The dehumidified air is directed into blower housing 114 where it mixes with the bypass air and flows into supply ducts 162. If the indoor humidity falls below a predetermined threshold value (for example, 60%), controller 104 closes motorized damper 128 in the dehumidification bypass 130, thereby directing more air over cooling coil 120. Cooling coil 120 operates by extracting heat from the air passing over it, and transferring that heat to the refrigerant.

Self-modulating HVAC system 100 utilizes a heat pump 106. Within heat pump 106 the refrigerant vapor flows out to the compressor 132 via the insulated refrigerant lines 166. The refrigerant vapor enters the compressor 132 and is pressurized to a temperature over 100 degrees. This hot refrigerant vapor circulates into the condenser coil 138 where the heat is released into the outdoor air and the refrigerant condenses back into a liquid. Prior to returning indoors to the cooling coil 120, the liquid refrigerant encounters expansion valve 136 which restricts the flow by forcing the refrigerant through a narrow orifice and converting the highly-pressurized liquid refrigerant back into a vaporized state which allows the cooling coil 120 to absorb heat energy. A reversing valve 134 may be used to reverse the process to provide heat to zones 144a-c. The compressor 132 and the blower 116 are the primary energy sinks in self-modulating HVAC system 100. To maintain the energy efficiency of self-modulating HVAC system 100, current transformer 142 installed on power line 140 measures and relays current usage and any current surge to controller 104. In turn, controller 104 may modulate the energy consumption of self-modulating HVAC system 100, by adjusting the speed of blower 116 and compression pressure to maintain energy-efficient levels. When sensors 108 send a cooling call for minimal cooling, referred to in an embodiment as "Stage 1 cooling" to controller 104, a circuit is activated to open motorized damper 126 allowing air to bypass cooling coil 120 and only allowing the manufacturer's required airflow to move across cooling coil 120. The bypassed air continues to blower compartment 114 and mixes with cooled air ejected from the coil housing 118. The air flowing from blower compartment 114 into supply ducts 162 is warmed, which in turn keeps the system running long enough to meet the appropriate air exchange rates per hour for zones 146ac. Cooling Coil Bypass 124 also acts as anti-freeze protection for cooling coil 120. If the refrigerant line falls below 36 degrees as detected by a temperature sensor connected to the suction line on coil 120, the controller 104 activates the circuit to close damper 126. The resulting increase in air flow across the coil raises the temperature of cooling coil 120.

Each of zones 146a-c contain sensors 108 that control zone dampers 144a-c. Zone dampers 144a-c control the supply air moving through supply ducts 164. Zone dampers 144a-c allow the self-modulating HVAC system 100 to control the air conditioning in each of zones 146a-c individually. The controller 104 contains a processor 148, memory 150, a Wi-Fi chipset 152 and input/output device 154. Input/output device 154 may be a touchscreen with a digital display or a display with input buttons. The Wi-Fi chip 152 connects the controller 104 via the internet 156 to the application server 112, which in turn allows a technician to remotely monitor via a technician machine 160, repair, and send instructions to the self-modulating HVAC system 100. The Wi-Fi chip 152 also allows the controller to email a client device 158 via the application server 112 with notifications.

An illustrative example of FIG. 1 is demonstrated using the following total airflow formula. The total airflow formula provides: Total Airflow (CFM)=Total Sensible Load (BTU/h)/1.08×Temperature difference of air in/out. While this formula is more accurate for heating applications than air conditioning, it is sufficient for the purposes of illustration. In a 3,627 ESF (29,016 Cu. Ft.) structure insulated to the present day core standard, this structure would have a total cooling load of approximately two tons for 85% of the year. An HVAC system sized to deliver a 400 CFM/ton cooling load will only deliver 800 CFMs of airflow. This would cause serious indoor air quality issues as the minimum airflow requirement in this example should be 1,934 CFMs at four air exchanges per hour. The requirement for airflow is a function of space, not BTU loads. This is due to the size of the volume of the space being conditioned, not the amount of cooling needed. However, from an energy efficiency standpoint, it remains the case that only 400 CFM/ton of cooling are required to service the conditioned space. Therefore, to reach the appropriate minimum air flow into the conditioned space without either overloading the cooling coil or oversizing the equipment, blower 116 works in conjunction with cooling coil bypass 124 and cooling coil bypass damper 126 to direct only the manufacturer's suggested airflow (400 CFM/ton) over an appropriately sized coil 120, while redirected the excess required airflow through cooling coil bypass 124.

Figure 2:
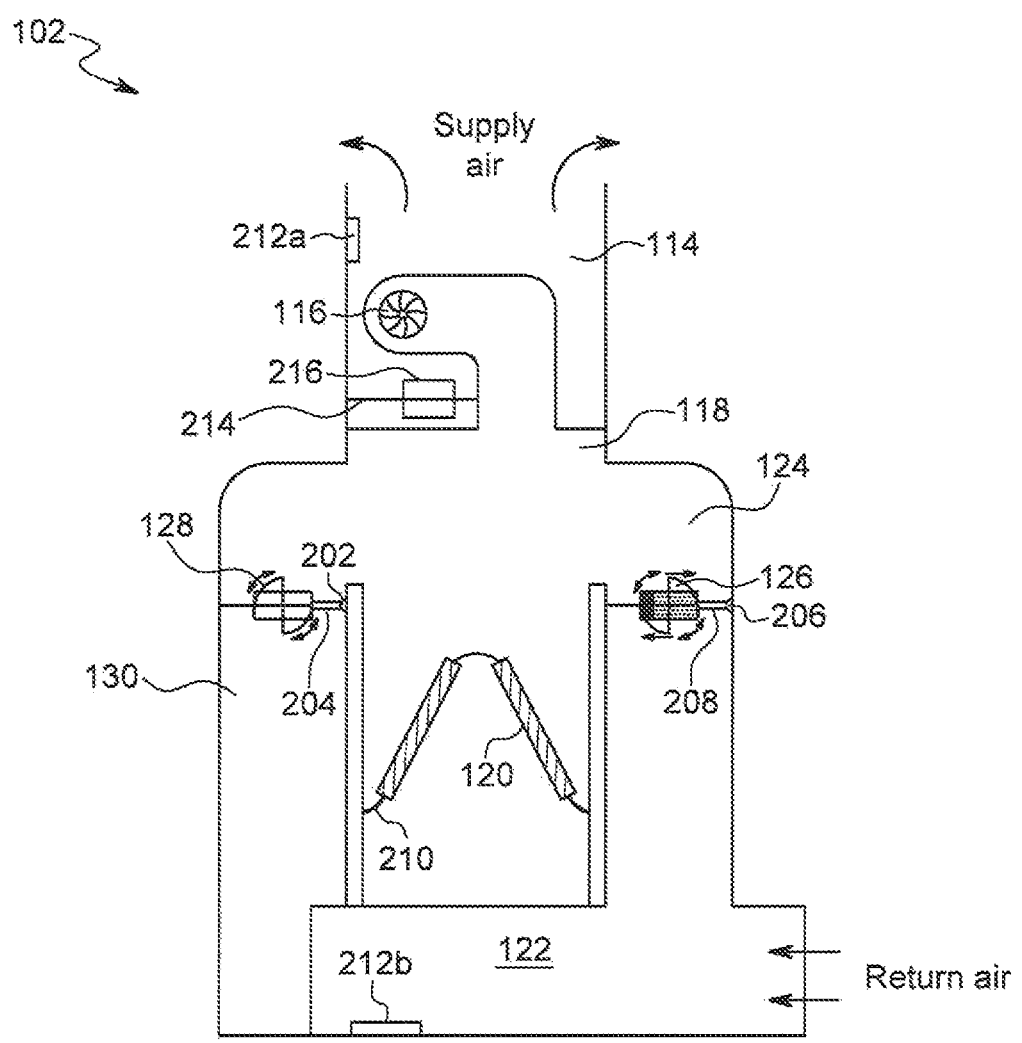
FIG. 2 is a functional diagram of an air handler of a self-modulating HVAC system, according to an embodiment.

Referring now to FIG. 2, an embodiment of air handler 102 may include a first differential pressure sensor 212a located in the blower housing 114 and a second differential pressure sensor 212b located in the R/A plenum 122. Blower 116 is connected to blower power supply 214. The energy consumed by blower power supply 214 is measured by current transformer 216. The return air flows from coil housing 118 through blower housing 114. A cooling call triggers controller 104 (as shown in FIG. 1) to activate the circuit controlling the cooling coil bypass damper motor 206 which in turn modulates the cooling coil bypass damper drive 208 to position cooling coil damper 126 in an open configuration. Positioning cooling coil damper 126 to an open configuration directs return air to flow through cooling coil bypass 124 and into blower housing 114. Cooling coil bypass damper drive 208 is operable to position cooling coil damper 126 in an integral position between 0 degrees and 90 degrees, such that the volume of air directed into cooling coil bypass 124 may be selectively regulated. Bypassing the return air maintains the appropriate air exchange rate and enables the optimal volume of air to pass over cooling coil 120, thereby increasing the dehumidification capacity of the coil. Mixing the cooled air with the bypassed air in blower housing 114 creates a volume of supply air that is warmer than the air directly discharged from coil 120. The warmer supply air has the effect of more gradually cooling the conditioned space, thereby increasing the run time and maintaining the appropriate airflow exchange.

A humidity call triggers controller 104 (as shown in FIG. 1) to activate the circuit controlling the enhanced dehumidification bypass damper motor 202 which in turn moves the dehumidification bypass damper drive 204 to configure dehumidification bypass damper 128 to an open position. The configuration of dehumidification bypass damper 128 to an open position redirects a desire portion of air to flow through dehumidification bypass 130 to blower housing 114, and directs a reduced volume of air to pass over cooling coil 120. Dehumidification bypass damper drive 204 is operable to position dehumidification bypass damper 128 to an integral position between 0 degrees and 90 degrees, such that the volume of air directed into enhanced dehumidification bypass 130 may be selectively regulated. The reduced volume of air passing over cooling coil 120 reduces the temperature of cooling coil 120 and increases the efficiency of latent moisture removal from the passing air. The resulting cool, dry air mixes with the bypassed air in blower housing 114 and provides a volume of mixed supply air to the connected duct work. The position of dehumidification bypass damper 128 is maintained, or modulated, until sensors 108 receive a humidity measurement in a conditioned space zones 144*a-c* within a threshold humidity value (e.g. 60%).

Figure 3:
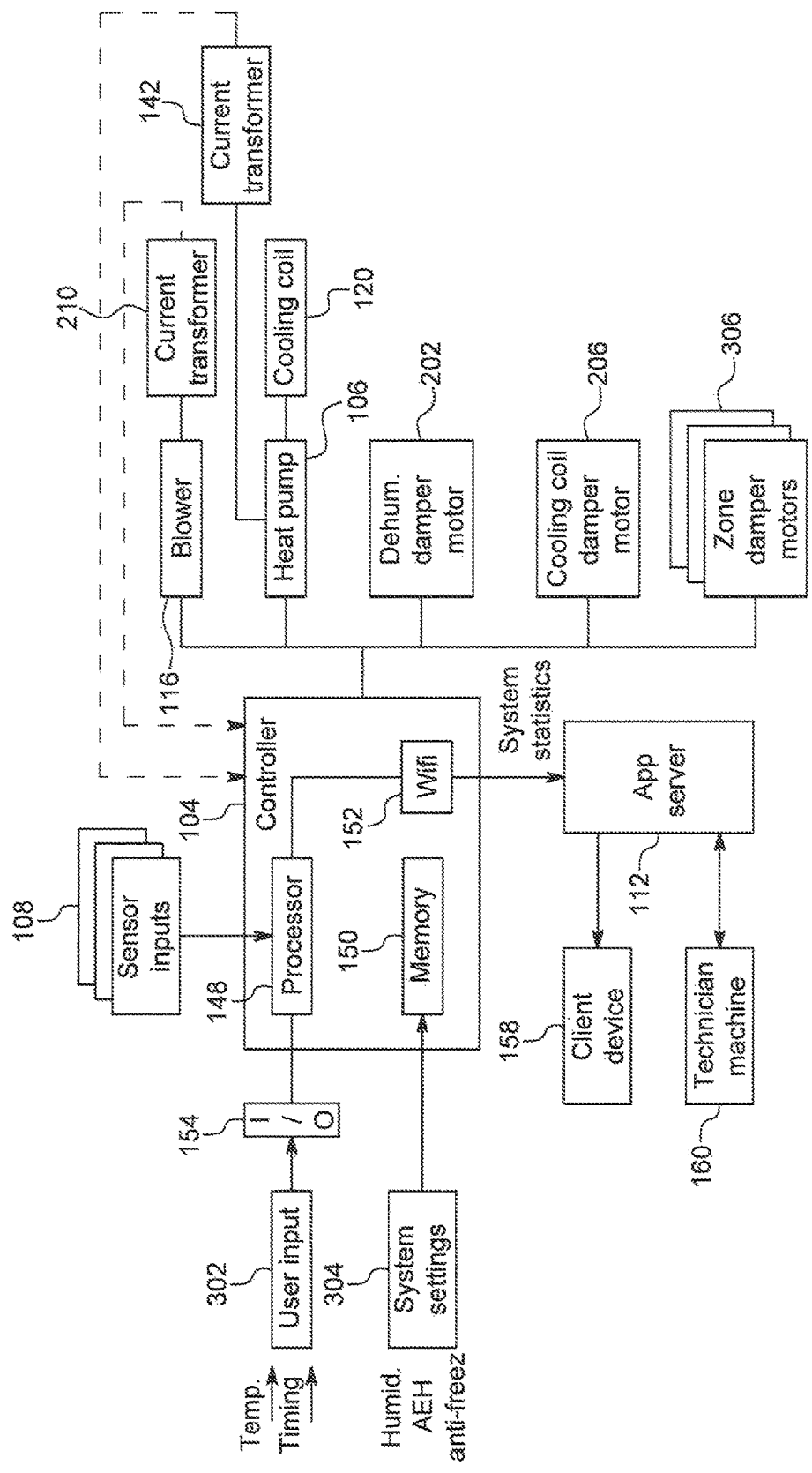
FIG. 3 is a process flow diagram of a self-modulating HVAC system, according to an embodiment.

FIG. 3 is a flow diagram of an embodiment of self-modulating HVAC system 100. Controller 104 is operable to store system settings 304 in memory 150 and receive parameters for all user inputs 302. System settings may include volume calculations of the zones 144*a-c* (as shown in FIG. 1) to be conditioned, a humidity threshold, a minimum air exchange rate per hour, an anti-freeze protection threshold for cooling coil 120 (e.g. 36 degrees Fahrenheit), as well as energy usage monitoring capabilities to maintain energy efficiency of HVAC system 100. A user input 302, such as a temperature threshold, is input into controller 104 via input/output interface 154. Processor 148 receives the data from input/output interface 154 and feedback from sensors 108, current transformer 142 (which measures the energy current supplied to heat pump 106), current transformer 216 (which measures the energy current supplied to blower 116), and the temperature of cooling coil 120. Controller 104 operates to modulate the system within the parameters of the system settings 304, and activate the circuit to modulate the cooling coil bypass damper motor 206 and initiate a cooling call in response to the desired temperature input 302. Controller 104 initiates cooling while monitoring and regulating energy usage of heat pump 106 and blower 116 to maintain optimal energy-efficiency. Sensor inputs 108 provide feedback to controller 104 to modulate the temperature of each zone individually. Controller 104 manages cooling of zones 144*a-c* (as shown in FIG. 1) by activating the circuits to the zone damper motors 306 to thereby modulate the position of zone dampers. System settings 304 stored in memory 150 prompt controller 104 to initiate conditioning when humidity levels surpass a humidity threshold (e.g. 60%) in zones 144*a-c* (as shown in FIG. 1). Controller 104 initiates the circuit that activates dehumidification damper motor 202, which in turn redirects airflow through dehumidification bypass 130. The resulting lowered volume of air passing over cooling coil 120 decrease the temperature cooling coil 120. An anti-freeze protocol executing on controller 104 monitors cooling coil 120 temperature fluctuations. When the temperature of cooling coil 120 drops below an anti-freeze threshold (e.g. 36 degrees Fahrenheit), controller 104 engages dehumidification damper motor 202 to close the dehumidification damper, thereby increasing the air volume across the cooling coil 120 to raise its temperature. Controller 104 utilizes Wi-Fi chip 152 to enable bi-directional communication with technician machine 160 and client device 158 via application server 112. Technician machine 160 may be operable to communicate remote programming or service instructions controller 104. Controller 104 may communicate system statistics and notifications to technician machine 160 and/or to client device 158 via application server 112.

Figure 4:
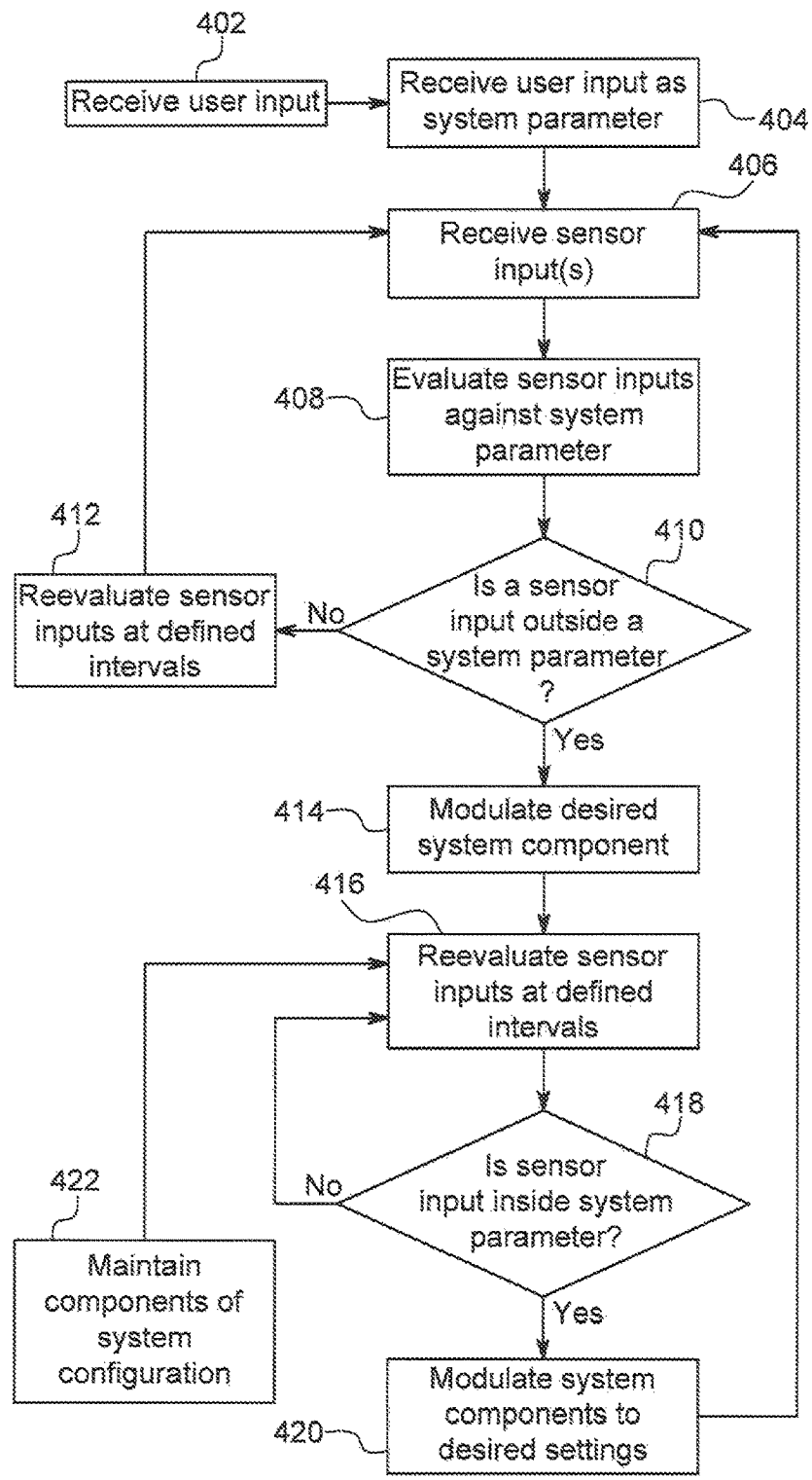
FIG. 4 a functional block diagram of a process flow of a self-modulating HVAC system, according to an embodiment.

Referring now to FIG. 4, a functional block diagram illustrating the process flow of a self-modulating HVAC system is shown. User input is received 402 and the user input is defined as a system parameter 404. Sensor inputs are received 406 and the resulting data is evaluated against the system parameters 408. A decision is made as to whether or not a sensor input is outside a system parameter 410. If "NO," no action is taken and the sensor input is reevaluated at defined intervals 412. If "YES," the desired system component is modulated 414 to bring the sensor input from the conditioned space within the system parameters. For example, system cooling may be initiated or blower speed may be increased or decreased. Once modulation is started, the sensor inputs from the conditioned space are reevaluated at defined intervals 416 to evaluate if the sensor input is within the system parameters 418. If "NO," the desired system configuration is maintained 422, or the system continues to proportionally modulate components until the sensor inputs from the conditioned space fall within the desired parameters. Sensor inputs are reevaluated at defined intervals 416 in a continuous feedback loop until the sensor inputs fall within the system parameters. If "YES," sensor inputs from the conditioned space fall within the system parameters, the system monitors the inputs and modulates components to maintain the achieved desired settings 420. The system again reevaluates sensor inputs at defined intervals 416 and compares the input to the system parameters, this feedback loop continues until the sensor input falls out of the system parameters or a new user input 402 is received to reinitiate the process.

Figure 5:
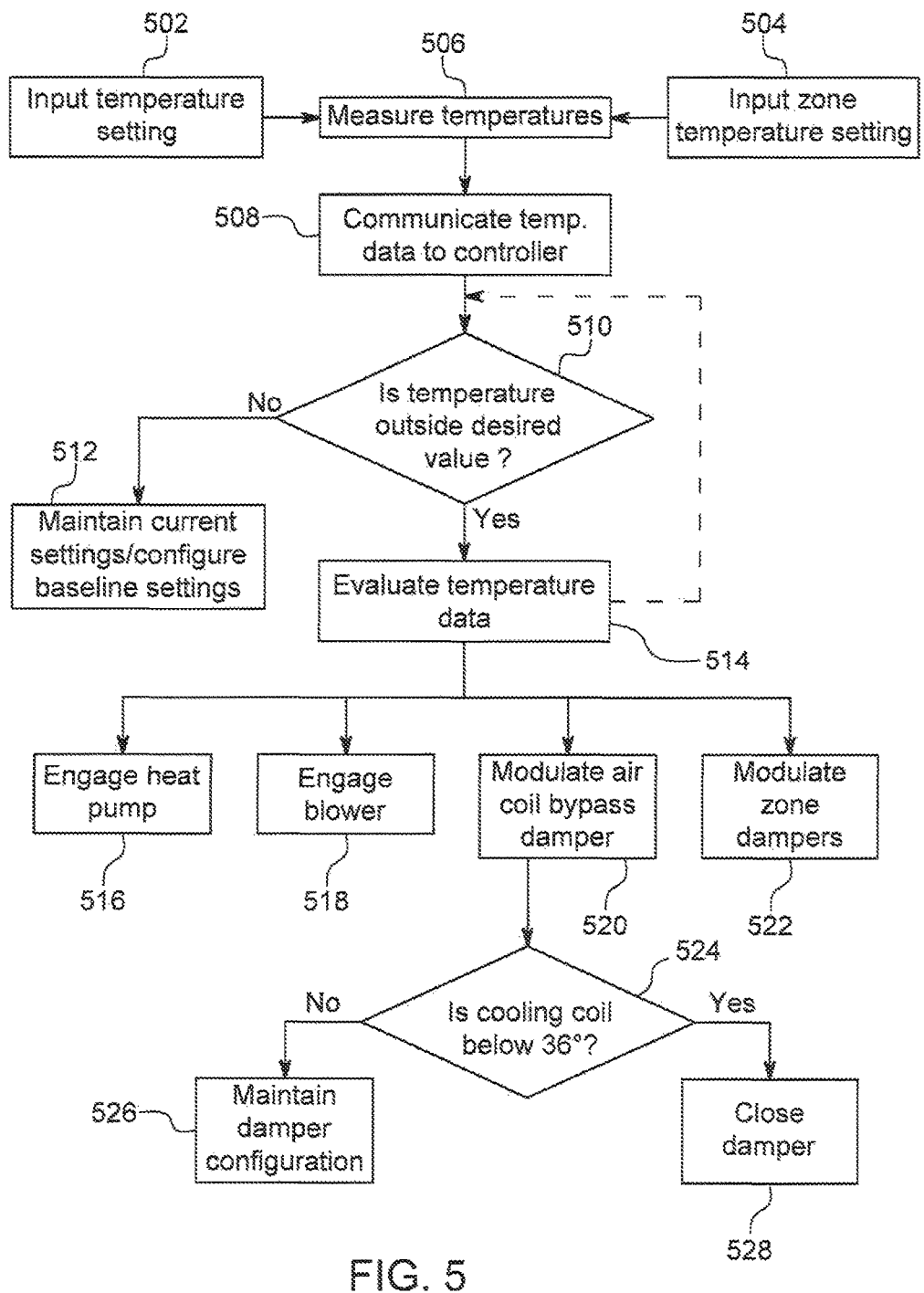
FIG. 5 is a functional block diagram of temperature modulation of a self-modulating HVAC system, according to an embodiment.

Referring now to FIG. 5, a functional block diagram illustrating temperature modulation of an embodiment of self-modulating HVAC system is shown. According to an embodiment, an input temperature 502 or a zone temperature setting input 504 is entered into the controller and is stored as a system parameter. The temperature within the conditioned space is continuously measured 506 by sensors. The temperature data is relayed to the controller 508. A decision is made as to whether the temperature reading is outside the desired values 510. If "NO," the system maintains the current settings or configures baseline settings 512. If "YES," the temperature is outside the desired value, the system measures the temperature delta 514 and decides what component to engage in order to bring the temperature back within the parameters of the desired temperature values. Options may include engaging the heat pump 516, engaging the blower 518, modulating the cooling coil bypass damper 520 by proportionally closing/opening to a desired interval, or modulating zone dampers 522 by proportionally closing/opening to a desired interval. The sensors operate in a feedback loop and regularly supply data to the controller regarding the measured temperature of the conditioned space. The controller continuously monitors the zone temperature against a desired system value 510. An anti-freeze system evaluates whether the cooling coil is below a threshold temperature (e.g. 36 degrees) 524. If "NO," the coil is not below a threshold temperature, the system maintains the dehumidification bypass damper configuration 526 to an open configuration. If "YES," the cooling coil temperature drops below a threshold temperature, the damper is modulated to a closed configuration 528. Closing the damper allows more air to move over the cooling coil, thereby raising the temperature of the coil and preventing freezing.

Figure 6:
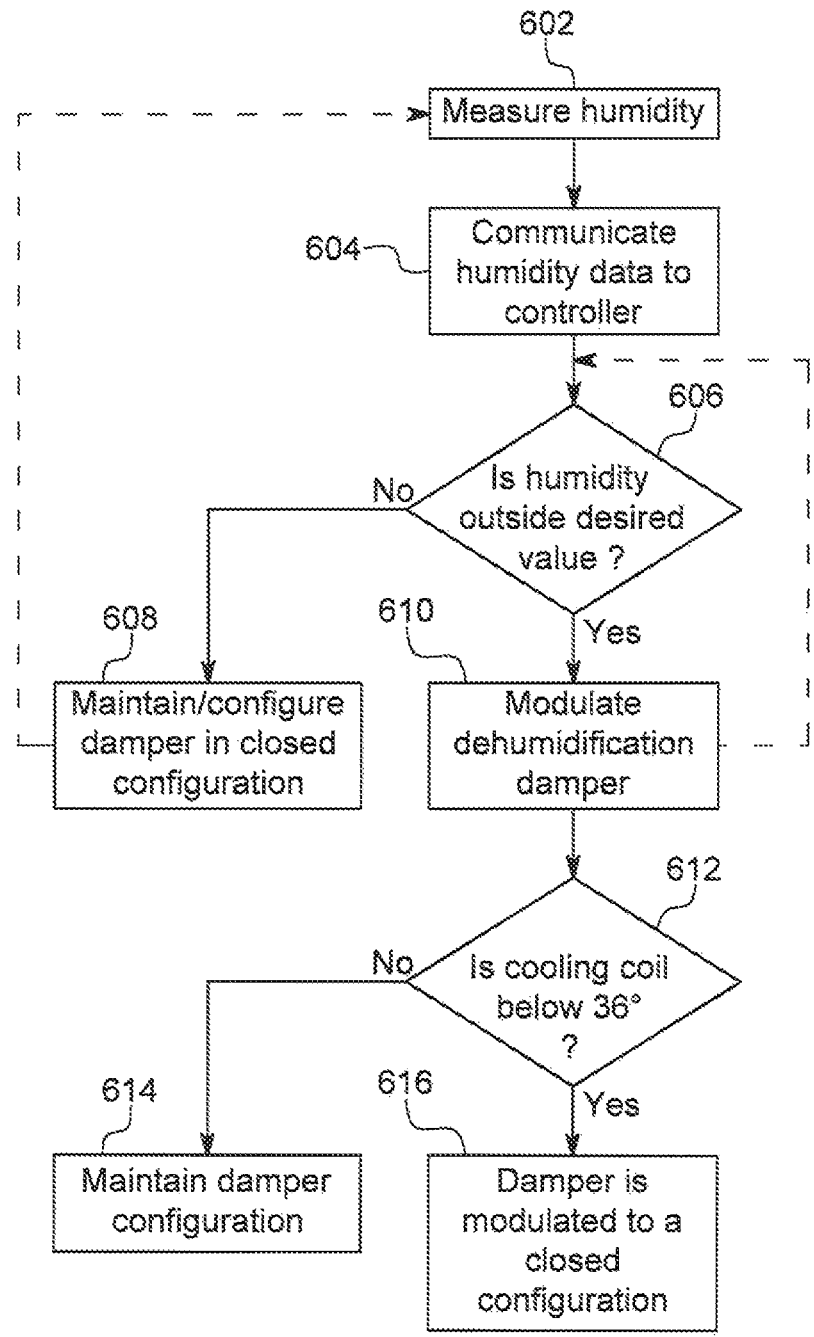
FIG. 6 is a functional block diagram of humidity modulation of a self-modulating HVAC system, according to an embodiment.

Referring now to FIG. 6, a functional block diagram demonstrating humidity modulation of a self-modulating HVAC system is shown. According to an embodiment, the settings within a controller include desired humidity parameters. Sensors measure humidity of a conditioned space 602 and relay the humidity data to the controller 604. The controller compares the data to the parameters and calculates if the humidity is outside the desired threshold value 606. If "NO," the humidity is not above the desired threshold value, then the system maintains or configures the damper in the dehumidification bypass 608 to the closed position and continues to measure the humidity level. If "YES," the humidity in the conditioned space is above the threshold minimum, the system modulates the enhanced dehumidification bypass damper 610 to an open configuration. Alternatively, enhanced dehumidification bypass damper may be modulated to an integral position between 0 degrees and 90 degrees, such that the volume of air directed into enhanced dehumidification bypass may be selectively regulated. When modulated to an open configuration, dehumidification bypass damper redirects the air from the R/A plenum through the dehumidification bypass and around the cooling coil and into the blower compartment; thereby increasing the temperature of the cooling coiling, which increases the rate of latent moisture removal. The system continues a feedback loop between the sensors and the controller to monitor the humidity value. An anti-freeze system evaluates whether the cooling coil is below a threshold temperature (e.g. 36 degrees). If "NO," the coil is not below a threshold temperature, the system maintains the dehumidification bypass damper configuration 614 to an open configuration. If "YES," the cooling coil temperature drops below a threshold temperature, the damper is modulated to a closed configuration 616. Closing the damper allows more air to move over the cooling coil, thereby raising the temperature of the coil and preventing freezing.

Figure 7:
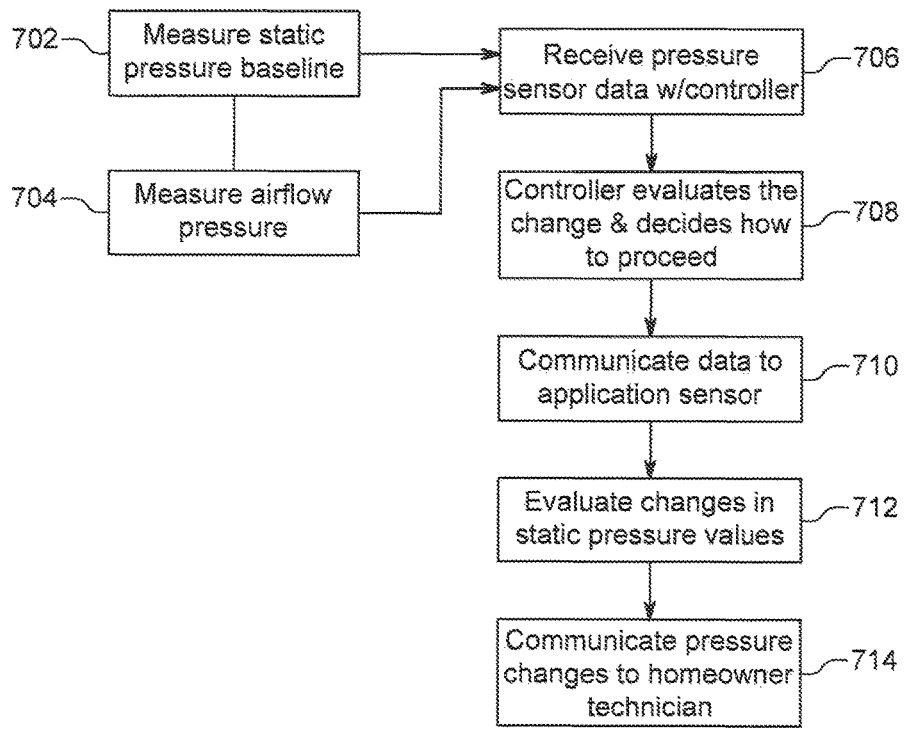
FIG. 7 is a functional block diagram of differential pressure reporting of a self-modulating HVAC system, according to an embodiment.

Referring now to FIG. 7, a functional block diagram demonstrating differential pressure reporting in a self-modulating HVAC system is shown. According to an embodiment, a pressure baseline 702 is calculated from the static pressure, which is the resistance to airflow through the system due to the surface area of the HVAC designs and ductwork. The sensors measure fluctuation in air flow pressure 704 that could be the result of a clogged filter, damaged ductwork, or partial closing/opening of zone dampers. The controller receives the pressure sensor data 706 and initiates a responsive action 708. If the pressure change is due to zone dampers opening or closing, the controller may trigger an increase or decrease to the fan speed as needed. If the pressure change is due to another issue, such as a clogged filter, the controller communicates the data to the application server 710. The server evaluates the pressure change 712 against baseline values and communicates the change in pressure and potential issue to the technician or homeowner 714 for corrective action.

Figure 8:
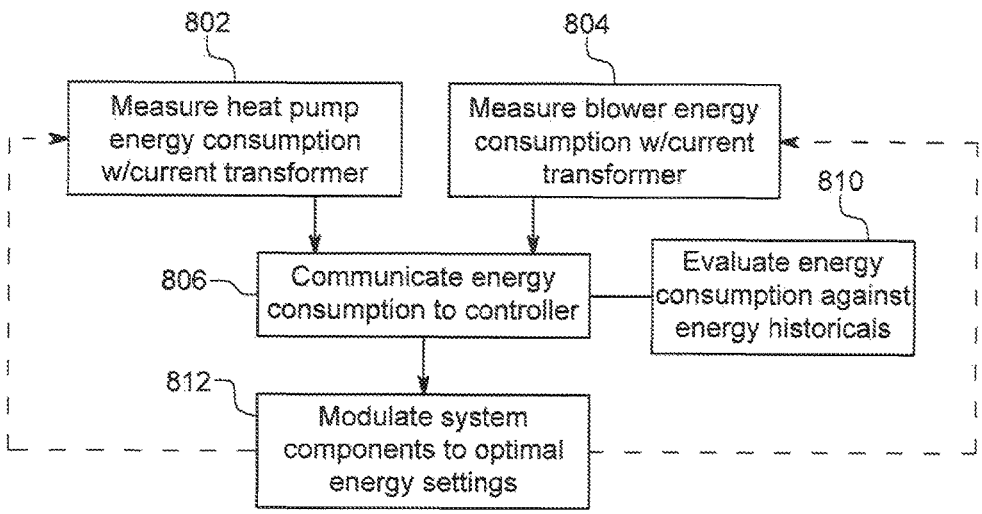
FIG. 8 is a functional block diagram of energy optimization of a self-modulating HVAC system, according to an embodiment.

Referring now to FIG. 8, a functional block diagram demonstrating an energy optimization process flow of a self-modulating HVAC system is shown. According to an embodiment, heat pump energy consumption is measured by a current transformer 802. Blower energy consumption is measured by a current transformer 804. The energy consumption for the blower and heat pump is communicated to the controller 806. The controller evaluates the energy consumption against energy historicals 810 to determine the sequence of modulations to execute for optimal energy efficiency. The controller activates circuits to modulate various system components in order to maintain system energy efficiency, such as incrementally closing or opening dampers, increasing compressor pressure, and/or changing blower fan speed. The controller continuously monitors the energy consumption data of the system to modulate system components to a desired setting for optimal energy efficiency.

Figure 9:
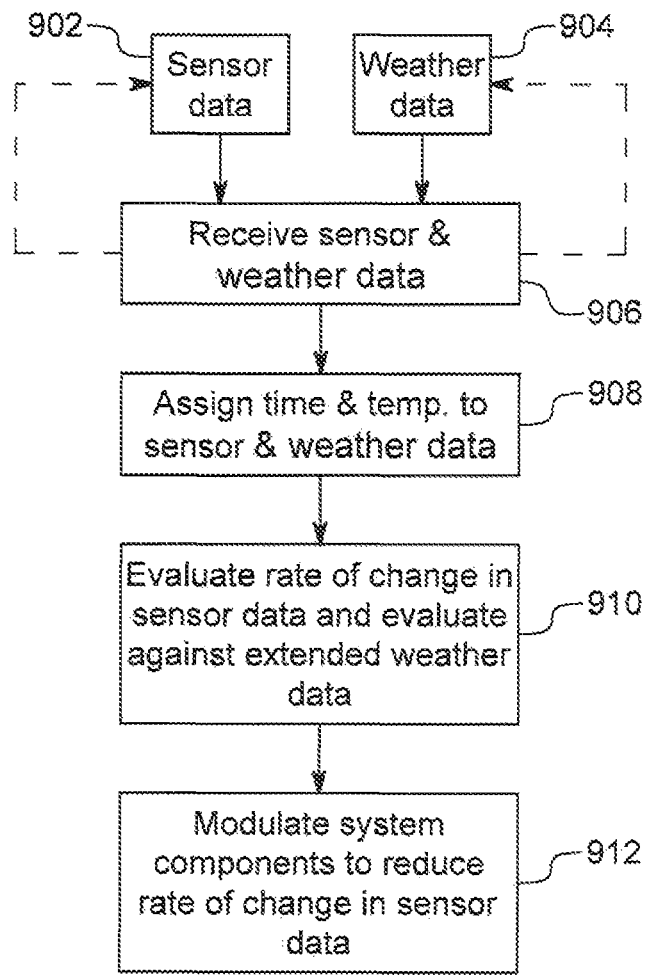
FIG. 9 is a functional block diagram of an anticipatory feedback loop of a self-modulating HVAC system, according to an embodiment.

FIG. 9 is a block diagram demonstrating an anticipatory feedback loop of a self-modulating HVAC system. According to an embodiment, internal sensor data 902 and corresponding outside weather data 904 is received by the controller 906. The controller assigns a time stamp to the sensor and weather data 908. The controller evaluates the rate of change of the incoming sensor data and compares this information to the external weather data 910. The controller evaluates how to proceed and activates circuits to modulate components gradually to anticipate the external temperature changes, thereby reducing the rate of change of the internal sensor data 912. Anticipating and limiting fluctuations in temperature and humidity in the conditioned space aids in maintaining energy efficiency.

Figure 10A:
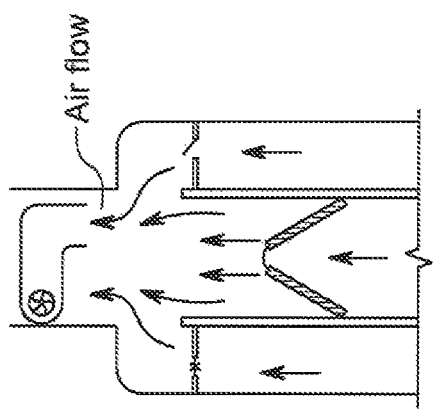
FIG. 10a-c are airflow diagrams under varying system conditions of a self-modulating HVAC system, according to an embodiment; and, FIG. 11 is a diagram of the flow of a reporting process of a self-modulating HVAC system, according to an embodiment.
Figure 10B:
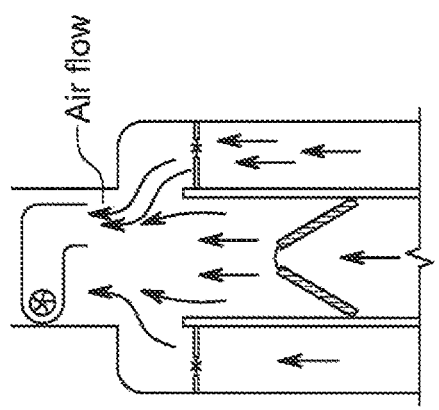
Figure 10C:
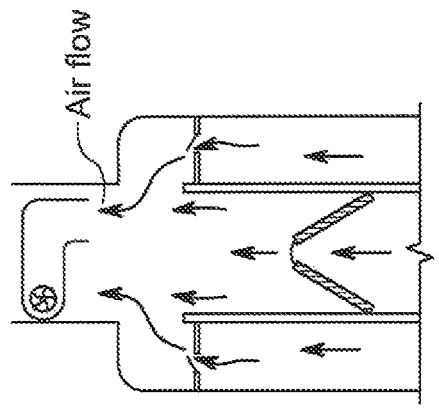

FIG. 10a-c, consists of three airflow diagrams that illustrate airflow in Stage One and Stage Two cooling in a self-modulating HVAC system. According to an embodiment, FIG. 10a illustrates a setting where Stage One cooling is activated while humidity levels remain below threshold values for a conditioned space. Stage One cooling is engaged where the delta between temperature in the conditioned space and the temperature setting are within a desired range, for example one degree above the desired temperature setting. The blower operates at a first speed and moves the air across the cooling coil at a manufacturers recommended volume (e.g. 400 CFM/ton), while bypassing additional airflow through the cooling coil bypass in order to maintain appropriate air exchange rate in the conditioned space without overloading the coil. The incremental opening of the cooling coil bypass damper directs air to continuously move through the system without over-cooling the conditioned space, and reduces the amount of air passing over the cooling coil to an optimal rate (as designated by a manufacturer). Bypassing air allows the proper amount of air exchanges to happen within a conditioned space, even when cooling is not needed, without exceeding suggested airflow over the coil. The dehumidification bypass damper remains closed, and directs remaining air over the cooling coil. FIG. 10b, illustrates airflow in an embodiment in Stage Two cooling with humidity is below a threshold value for a conditioned space. Stage Two cooling occurs where the delta between temperature in the conditioned space and the desired temperature are within a desired range, for example one degree above the desired temperature setting. In FIG. 10b, the blower speed remains at 100% airflow. The cooling coil bypass damper is configured to a closed position, or a fixed minimum configuration to bypass additional airflow over 400 CFM/ton of cooling capacity. The dehumidification bypass damper is configured in a closed position where the humidity level is below a threshold value for the conditioned space. FIG. 10c, illustrates airflow in an embodiment in Stage One cooling where humidity of the conditioned space has exceeded a threshold level. The cooling coil bypass damper is configured to an integral position such that a desired volume of air is redirected around the cooling coil. In FIG. 10c, the humidity level has exceeded a threshold level. The dehumidification bypass damper is modulated to an open configuration to allow a desired volume of airflow to bypass the cooling coil; thereby reducing the cooling coil temperature. The rise in cooling coil temperature due to reduced airflow from the coil increases the rate of latent heat removal from the passing air, thereby reducing the humidity in the downstream discharge air. The dehumidification bypass damper remains in the open position until the controller receives input from sensors in the conditioned space that the humidity level has fallen below a target value (e.g. 60%).

Figure 11:
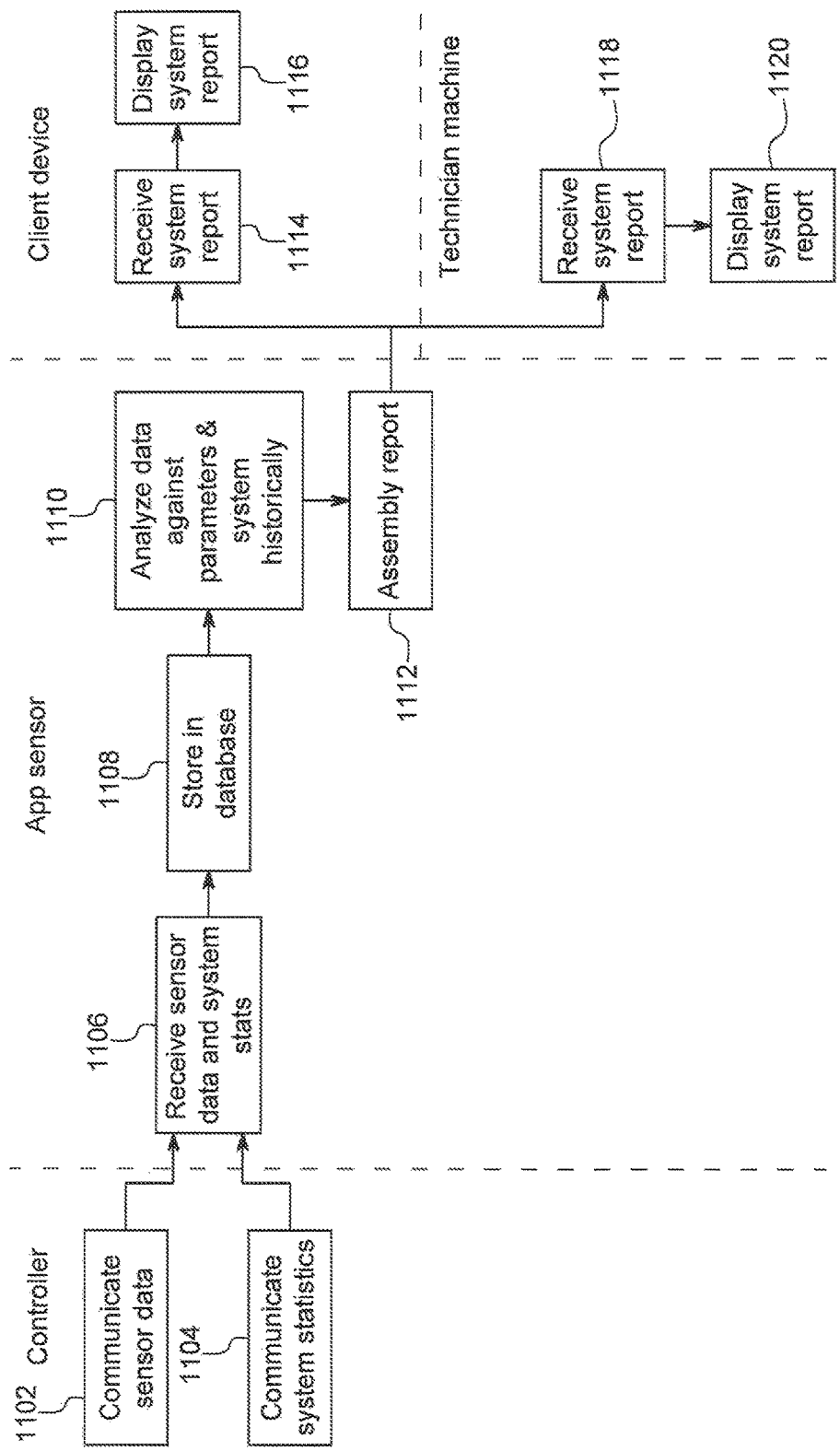

Referring now to FIG. 11, a block diagram of a reporting process flow for a self-modulating HVAC system is shown. According to an embodiment, the controller communicates received input sensor data 1102 and system statistics 1104 to an application server. The sensor data may include pressure changes indicating a problem with the system or increases in energy usage and daily consumption. The application server receives the sensor data and system statistics 1106 and stores the information in a database 1108. The application server analyzes the incoming data against set parameters and system historicals 1110 to identify patterns and aberrations in the systems functioning. From this analysis, the application server assembles a report 1112 to be sent to a client device or technician machine. For example, the client device may receive system report 1114 stating that a pressure change has occurred near a specific filter indicating that filter needs to be changed, and displays the report 1116 on the client device. This display could also be through an application push notification. In a different scenario, a pressure increase may occur across the entire system, indicating a component problem. The application server sends a report to the technician machine 1118, which receives and displays the system report 1120. Bi-directional communication allows the technician to engage diagnostics within the controller to trouble-shoot the problem remotely.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention. The terms and expressions which have been employed in the foregoing description are used therein as terms of description and not of limitation, and there is no intention in the use of such terms and expressions to exclude equivalents of the features shown and described or portions thereof, it being recognized that the scope of the invention is defined and limited only by the claims which follow.

What is claimed is:

1. A self-modulating air handler, comprising:
    a variable speed blower, the variable speed blower being housed in a blower chamber;
    a cooling coil, the cooling coil being housed in a coil chamber, the coil chamber being coupled to the blower chamber;
    a return air plenum coupled to the coil chamber, the coil chamber defining a first airflow path from the return air plenum to the blower chamber;
    a cooling coil bypass coupled to the return air plenum at a first end and coupled to the blower chamber at a second end, the cooling coil bypass defining a second airflow path from the return air plenum to the blower chamber;
    a dehumidification bypass coupled to the return air plenum at a first end and coupled to the blower chamber at a second end, the dehumidification bypass defining a third airflow path from the return air plenum to the blower chamber;
    a first motorized damper housed in the cooling coil bypass between the return air plenum and the blower chamber, the first motorized damper being configured to direct a first volume of airflow from the return air plenum to the blower chamber through the coil chamber and a second volume of airflow from the return air plenum to the blower chamber through the cooling coil bypass; and
    a second motorized damper housed in the dehumidification bypass between the return air plenum and the blower chamber, the second motorized damper being configured to direct a third volume of airflow from the return air plenum to the blower chamber through the dehumidification bypass so as to reduce a volume of air passing over the cooling coil to increase an amount of dehumidification provided by the air handler, wherein the second motorized damper is operable to be configured to a desired position in response to a predetermined humidity threshold,
        wherein the first motorized damper and the second motorized damper are selectively configured to a position between 0 degrees and 90 degrees.

2. The self-modulating air handler of claim 1 further comprising at least one differential pressure sensor on a return side of the self-modulating air handler and at least one differential pressure sensor on a supply side of the self-modulating air handler.

3. The self-modulating air handler of claim 1 wherein the first motorized damper is operable to be configured to a desired position in response to a speed setting of the variable speed blower.

4. The self-modulating air handler of claim 1 further comprising a current transformer coupled to a power line of the variable speed blower.

5. A self-modulating HVAC system, comprising:
    an air handler, the air handler comprising:
        a variable speed blower, the variable speed blower being housed in a blower chamber;
        a cooling coil housed in a coil chamber, the coil chamber being coupled to the blower chamber;
        a return air plenum coupled to the coil chamber, the coil chamber defining a first airflow path from the return air plenum to the blower chamber;
        a cooling coil bypass coupled to the return air plenum at a first end and coupled to the blower chamber at a second end, the cooling coil bypass defining a second airflow path from the return air plenum to the blower chamber;

a dehumidification bypass coupled to the return air plenum at a first end and coupled to the blower chamber at a second end, the dehumidification bypass defining a third airflow path from the return air plenum to the blower chamber;

a first motorized damper housed in the cooling coil bypass between the return air plenum and the blower chamber, the first motorized damper being configured to direct a first volume of airflow from the return air plenum to the blower chamber through the cooling coil chamber and a second volume of airflow from the return air plenum to the blower chamber through the cooling coil bypass; and a second motorized damper housed in the dehumidification bypass between the return air plenum and the blower chamber, the second motorized damper being operably configured to direct a third volume of airflow from the return air plenum to the blower chamber through the dehumidification bypass so as to reduce a volume of air passing over the cooling coil to increase an amount of dehumidification provided by the air handler;

a heat pump, operably engaged with the air handler;

a plurality of sensors comprising at least one temperature sensor and at least one humidity sensor; and a controller, the controller being operably engaged with the air handler and the heat pump and being configured to receive a data input from the plurality of sensors, the controller being comprised of one or more processors, an input/output device, a Wi-Fi chipset, and a non-transitory computer readable medium having stored thereon a set of instructions being programmable by a user and executable by the at least one of the one or more processors, to cause the at least one of the one or more processors to perform one or more operations, the set of instructions comprising:

instructions for modulating the position of the first motorized damper in response to a data input from the at least one temperature sensor;

instructions for modulating the position of the second motorized damper in response to a data input from the at least one humidity sensor; and instructions for selectively engaging the heat pump and the variable speed blower in response to a data input from the at least one temperature sensor.

6. The self-modulating HVAC system of claim 5 wherein a current transformer is operably coupled to a power line of the heat pump, the current transformer being communicably engaged with the controller.

7. The self-modulating HVAC system of claim 5 wherein the first motorized damper and the second motorized damper are operable to modulate to a position between 0 degrees and 90 degrees.

8. The self-modulating HVAC system of claim 6 wherein the non-transitory computer readable medium further comprises instructions for modulating a position of the first motorized damper and a speed of the variable speed blower in response to a data input from the current transformer.

9. A self-modulating HVAC system, comprising:

an air handler, the air handler comprising:
　a variable speed blower, the variable speed blower being housed in a blower chamber;
　a cooling coil being housed in a coil chamber, the coil chamber being coupled to an upstream portion of the blower chamber;
　a return air plenum coupled to an upstream portion of the coil chamber, the coil chamber defining a first airflow path from the return air plenum to the blower chamber;
　a cooling coil bypass coupled to the return air plenum at a first end and coupled to the blower chamber at a second end, the cooling coil bypass defining a second airflow path from the return air plenum to the blower chamber;
　a dehumidification bypass coupled to the return air plenum at a first end and coupled to the blower chamber at a second end, the dehumidification bypass defining a third airflow path from the return air plenum to the blower chamber;
　a first motorized damper housed in the cooling coil bypass between the return air plenum and the blower chamber, the first motorized damper being configured to direct a first volume of airflow from the return air plenum to the blower chamber through the cooling coil chamber and a second volume of airflow from the return air plenum to the blower chamber through the cooling coil bypass; and
　a second motorized damper housed in the dehumidification bypass between the return air plenum and the blower chamber, the second motorized damper being configured to direct a third volume of airflow from the return air plenum to the blower chamber through the dehumidification bypass so as to reduce a volume of air passing over the cooling coil to increase an amount of dehumidification provided by the air handler;

a heat pump, operably engaged with the air handler;

a plurality of sensors comprising a temperature sensor, a humidity sensor, and a current transformer;

a controller, the controller being operably engaged with the air handler and the heat pump and being configured to receive a data input from the plurality of sensors, the controller being comprised of one or more processors, an input/output device, a WiFi chipset, and a non-transitory computer readable medium having stored thereon a set of instructions being programmable by a user and executable by the at least one of the one or more processors, to cause the at least one of the one or more processors to perform one or more operations, the set of instructions comprising:

instructions for modulating the position of the first motorized damper in response to a data input from the temperature sensor;

instructions for modulating a position of the first motorized damper and a speed of the variable speed blower in response to a data input from the current transformer;

instructions for modulating the position of the second motorized damper in response to a data input from the humidity sensor; and instructions for selectively engaging the heat pump and the variable speed blower in response to a data input from the temperature sensor; and an application server, the application server being communicably engaged with the controller, the application server being comprised of one or more processors and a non-transitory computer readable medium having stored thereon and executable by the at least one of the one or more processors, to cause the at least one of the one or more processors to perform one or more operations, the set of instructions comprising:
instructions for receiving sensor data from the controller; and
instructions for communicating a service notice in response to sensor data to a client device.

10. The self-modulating HVAC system of claim 9 wherein the first motorized damper and the second motorized damper are operable to modulate to a position between 0 degrees and 90 degrees.

* * * * *